(12) United States Patent
Wu

(10) Patent No.: US 6,574,387 B2
(45) Date of Patent: Jun. 3, 2003

(54) ALL-OPTICAL SWITCHING SYSTEM AND METHOD THEREOF

(75) Inventor: Wei-Jyei Wu, Taipei (TW)

(73) Assignee: Desun System Inc., Taipei (TW)

( * ) Notice: Subject to any disclaimer, the term of this patent is extended or adjusted under 35 U.S.C. 154(b) by 42 days.

(21) Appl. No.: 09/946,116

(22) Filed: Sep. 4, 2001

(65) Prior Publication Data

US 2003/0053740 A1 Mar. 20, 2003

(30) Foreign Application Priority Data

Aug. 14, 2001 (TW) ........................................ 90119936 A

(51) Int. Cl.[7] ................................................. G02B 6/26
(52) U.S. Cl. ......................................................... 385/17
(58) Field of Search ............................. 385/16–20, 24, 385/129, 138; 359/110, 138

(56) References Cited

U.S. PATENT DOCUMENTS

| | | |
|---|---|---|
| 4,580,873 A | 4/1986 | Levinson |
| 4,988,157 A | 1/1991 | Jackel et al. |
| 5,757,526 A * | 5/1998 | Shiragaki et al. ............ 359/110 |
| 6,169,826 B1 | 1/2001 | Nishiyama et al. |
| 6,175,433 B1 * | 1/2001 | Patel et al. .................. 359/138 |
| 6,208,792 B1 * | 3/2001 | Hwang et al. ............... 385/129 |
| 6,292,598 B1 * | 9/2001 | Price et al. ...................... 385/2 |
| 2001/0015842 A1 * | 8/2001 | Patel et al. .................. 359/138 |
| 2002/0191906 A1 * | 12/2002 | Price et al. .................... 385/24 |

FOREIGN PATENT DOCUMENTS

| | | |
|---|---|---|
| CN | 296806 | 8/1984 |
| CN | 289441 | 1/1985 |

* cited by examiner

Primary Examiner—Alan E. Ullah

(57) ABSTRACT

The present invention provides an all-optical switching system and the method thereof. The system comprises: N 1×M splitters for receiving N sets of optical data $I_1, I_2, \ldots, I_{N-1}, I_N$, wherein said N splitters individually split said N sets of optical data separately to form a N×M matrix of optical data, wherein N and M are integers; a N×M matrix switching structure for receiving the N×M matrix of optical data generated by the N splitters and another driving signal matrix to generate N×M matrix of optical data; and M N×1 combiners for receiving the N×M matrix of optical data from the N×M matrix switching structure to combine them into M sets of optical data $O_1, O_2, \ldots, O_{M-1}, O_M$, respectively.

12 Claims, 12 Drawing Sheets

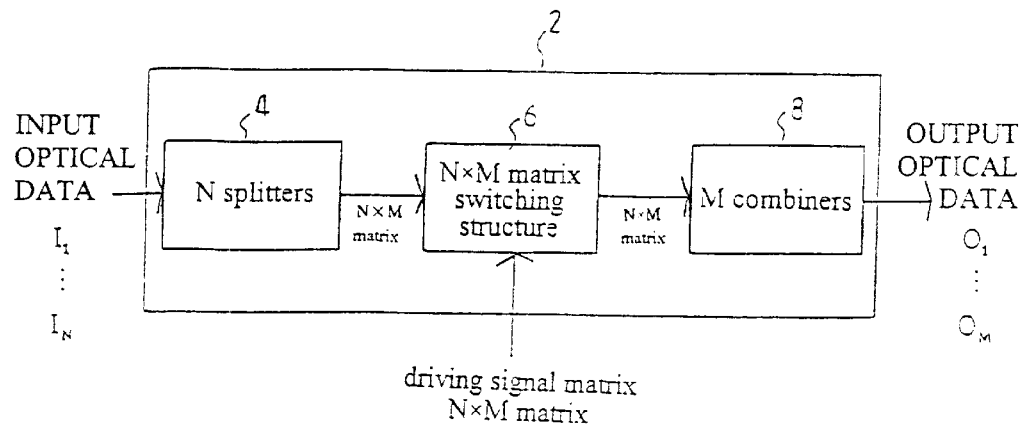
FIG. 1
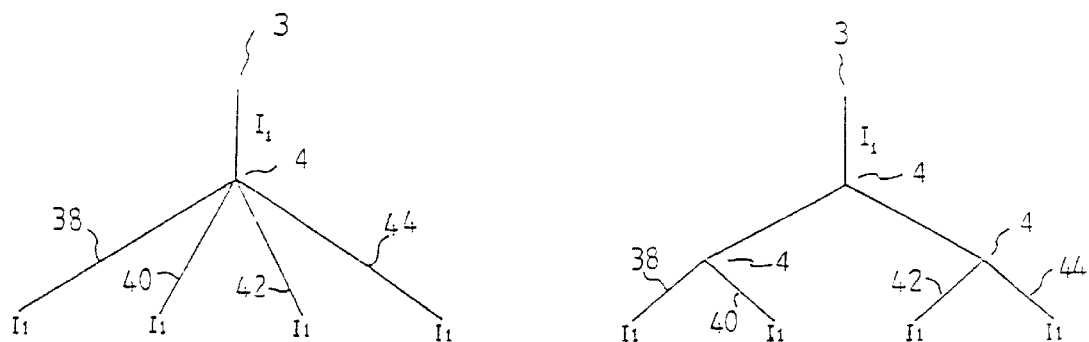
FIG. 2A
FIG. 2B

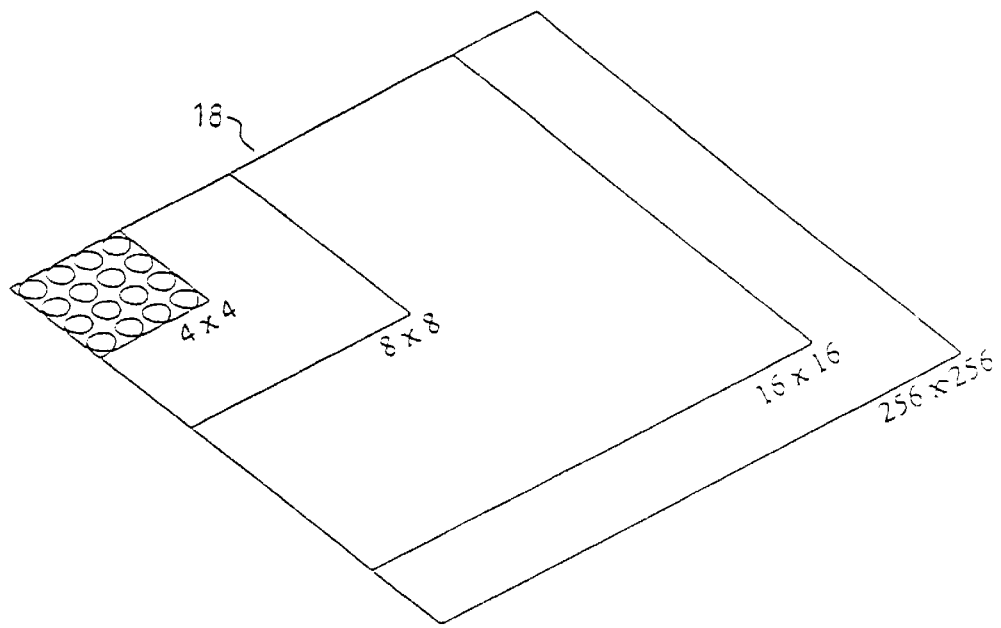
FIG. 3
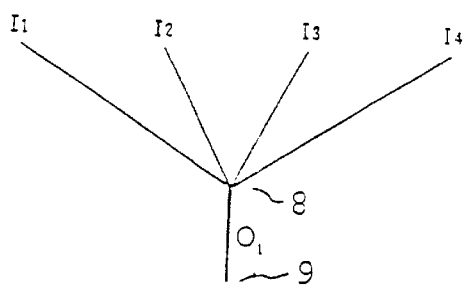
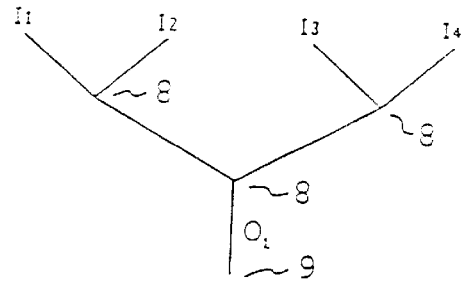
FIG. 4A          FIG. 4B use LCD ON/OFF Switch Table to control if the light passes through or not

ALL-OPTICAL SWITCHING SYSTEM AND METHOD THEREOF

BACKGROUND OF THE INVENTION

1. Field of the Invention

The present invention relates to a highly efficient all-optical switching system and the method thereof. With the method provided by the present invention the transmission rate of the optical fiber communication network increases a lot.

2. Related Art

Along with the rapid growth of the Internet and mobile phone users, the demand of the data transmission rate and the need of the broad-band communication are getting higher and higher. It is a trend in the future to use the optical fiber network with the light as a medium of transmission. Although the data on the optical fiber network is transmitted in the form of light, a router of the optical fiber network could only routes electrical signals. Thus when the optical data is transmitted to a routing point, it has to be converted into electrical data first. After the electrical data is routed by the electrical router (switching system), it has to be converted back into the optical data and to be transmitted by the optical fiber network subsequently. Such "optical data-electrical data-optical data" (O-E-O) routing mode not only costs higher but also reduces the transmission rate of the optical data and becomes a bottle-neck of the transmission rate of the optical fiber network.

There are several conventional all-optical switching devices (optical data-optical data-optical data, O-O-O) of communication network as follows.

1. A device which utilizes movable mirrors to do the light switching (refer to U.S. Pat. No. 4,580,873);
2. A device which utilizes refraction of air bubbles to do the light switching (refer to U.S. Pat. No. 4,988,157);
3. A device which utilizes movable fibers and the principle of magnetic field to do the light switching (refer to U.S. Pat. No. 6,169,826);
4. A device which utilizes movable fibers and the principle of a spiral motor to do the light switching (refer to ROC Patent Publication Nos. 296,806 and 289,441);

3. The Disadvantages of the Prior Arts

1. To Use the Movable Mirrors to Do the Light Switching

This is a kind of mechanical rotating apparatus whose rotating shaft of the mirrors might affect the light signal transmission with wrong rotating angles caused by mechanical fatigue. It is hard to detect if there is anything wrong with the rotating angle of the mirrors, and the cost of maintenance is high. Besides, a n×m switching structure (n input light signals and m output light signals) needs n×m mirrors. Since there is a limit to reduce the mirrors in size, the system is huge. The area of a 64×64 switching structure will be 256 times of that of the 4×4 switching structure in size.

2. To Use the Refraction of Air Bubbles to Do the Light Switching

It is similar to the principle of the mirror refraction mentioned above, but it is liquid bubble used for refraction in this case. When the light passes the liquid, it is refracted by the bubble generated from the liquid. The liquid in the envelopes will be vaporized after a long time usage or the tiny dust will enter the envelopes due to the untight envelopes which might affect the generated bubbles and cause inaccurate refraction angle. It will be hard to refill the envelopes after the liquid is vaporized if the envelopes are too tight. Also it is needed to detect the status of the liquid often. The cost for maintenance is high.

3. To Use the Movable Fibers and the Principle of the Magnetic Field to Do the Light Switching This method only applied to one-dimensional switching device (1×N) and is actually hard to apply to two-dimensional switching device (N×M).

4. To Use the Movable Fibers and the Principle of the Spiral Motor to Do the Light Switching This method only applied to one-dimensional switching device (1×N) and is actually hard to apply to two-dimensional switching device (N×M).

The most serious disadvantage of the above mentioned four methods is that they can not be commercially mass produced. There are some serious problems of the reliability and the cost to be resolved.

SUMMARY OF THE INVENTION

This invention utilizes "optical data-optical data-optical data" (O-O-O) switching mode to switch the light directly and to avoid the disadvantage of the low transmission rate of the conventional (O-E-O) switching system and improve the disadvantages of the conventional (O-O-O) switching system.

This invention is to provide a feasible, highly-efficient all-optical switching system and a method thereof. To use the method provided by this invention will increase the transmission rate of the optical fiber communication network.

This invention provides an all-optical switching system and its method. The system comprises: N 1×M splitters for receiving N sets of optical data $I_1, I_2, \ldots, I_{N-1}, I_N$. Said N splitters split said N sets of optical data into M sets of optical data respectively and generate a N×M matrix D of optical data as follows:

$$D = \begin{bmatrix} D_{1,1} & D_{1,2} & \cdots & D_{1,M-1} & D_{1,M} \\ D_{2,1} & D_{2,2} & \cdots & D_{2,M-1} & D_{2,M} \\ \vdots & \vdots & \ddots & \vdots & \vdots \\ D_{N-1,1} & D_{N-1,2} & \cdots & D_{N-1,M-1} & D_{N-1,M} \\ D_{N,1} & D_{N,2} & \cdots & D_{N,M-1} & D_{N,M} \end{bmatrix}$$

wherein N and M are integers, the M sets of optical data $D_{1,1}, D_{1,2}, \ldots, D_{1,M-1}, D_{1,M}$ are generated by the first 1×M splitter by splitting the first optical data $I_1$, and $D_{1,1}=D_{1,2}=\ldots=D_{1,M-1}=D_{1,M}=I_1$. On the analogy of this, an N×M matrix switching structure to receive the N×M matrix D of optical data generated by the splitters and receive another driving signals matrix S simultaneously as follows:

$$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \vdots & \vdots & \ddots & \vdots & \vdots \\ S_{N-1,1} & S_{N-1,2} & \cdots & S_{N-1,M-1} & S_{N-1,M} \\ S_{N,1} & S_{N,2} & \cdots & S_{N,M-1} & S_{N,M} \end{bmatrix}$$

and generates an N×M matrix D' of optical data as follows:

$$D' = \begin{bmatrix} D'_{1,1} & D'_{1,2} & \cdots & D'_{1,M-1} & D'_{1,M} \\ D'_{2,1} & D'_{2,2} & \cdots & D'_{2,M-1} & D'_{2,M} \\ \vdots & \vdots & \ddots & \vdots & \vdots \\ D'_{N-1,1} & D'_{N-1,2} & \cdots & D'_{N-1,M-1} & D'_{N-1,M} \\ D'_{N,1} & D'_{N,2} & \cdots & D'_{N,M-1} & D'_{N,M} \end{bmatrix}$$

M sets of N×1 combiners receive the N×M matrix D' of optical data output from the N×M matrix switching structure. Said M sets of combiners combine N sets of optical data respectively to generate M sets of optical data $O_1$, $O_2, \ldots, O_{M-1}, O_M$, wherein the first output optical data $O_1$ is generated by the first combiner after combining N sets of optical data $D'_{1,1}, D'_{2,1}, \ldots, D'_{N-1,1}, D'_{N,1}$, on the analogy of this.

In order to make the technical contents and characteristics easier to be understood, the preferred embodiment is introduced with the brief description of the drawings as follows.

BRIEF DESCRIPTION OF THE DRAWINGS

This invention will become better understood with reference to the accompanying drawings in which:

FIG. 1 shows this invention, all-optical switching system of the present invention;

FIG. 2A is the input-output relationship of a 1×4 splitter;

FIG. 2B is the input-output relationship of a 1×2 splitter;

FIG. 3 is a LCD N×M matrix optical switching structure when N=M;

FIG. 4A is the input-output relationship of a 4×1 combiner;

FIG. 4B is the input-output relationship of a 2×1 combiner;

Figure 5A:
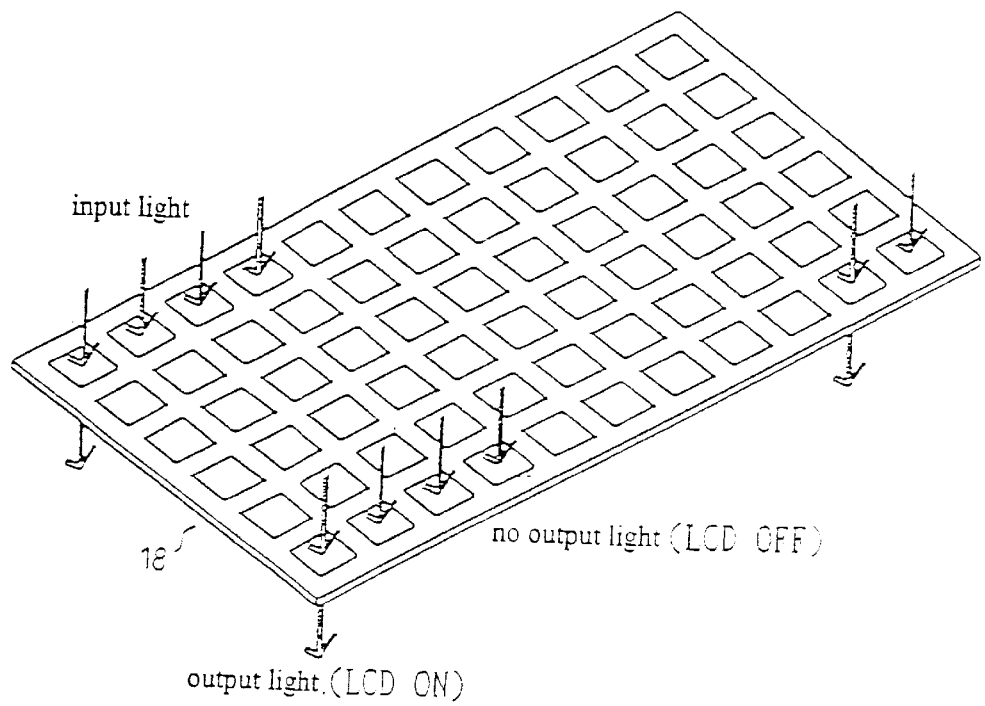
FIG. 5A is a perspective view of a LCD on/off switching table.

LIST OF REFERENCE NUMERALS OF THE MAJOR PARTS IN THE DRAWINGS 2 all-optical switching system
3 optical fiber
4 splitter
6 N×M matrix switching structure
8 combiner
9 optical fiber
18 LCD N×M matrix optical switching structure
30, 32, 34, 36 input fibers
38, 40, 42, 44 output fibers

DETAILED DESCRIPTION OF THE PREFERRED EMBODYMENT

A preferred embodiment of the present invention will be described below with reference to the accompanying drawings. The same element in the drawings is represented with the same reference numeral.

FIG. 1 shows an all-optical switching system of the present invention. FIG. 1 illustrates the relationship among the N sets of splitters 4, LCD N×M matrix optical switching structure 6 and M sets of combiners 8.

As shown in FIG. 1, the important characteristics of the structure of the present invention is that the present invention uses an (O-O-O) switching mode to switch the light directly, in comparison with the prior art (O-E-O) mode. Thus the disadvantage of the bottle-neck of the transmission rate of the prior art (O-E-O) system could be avoided.

As shown in FIG. 1 the N sets of optical data $I_1, I_2, \ldots, I_{N-1}, I_N$ are split by N 1×M splitters 4. N×M optical data matrix is generated as shown below:

$$D = \begin{bmatrix} D_{1,1} & D_{1,2} & \cdots & D_{1,M-1} & D_{1,M} \\ D_{2,1} & D_{2,2} & \cdots & D_{2,M-1} & D_{2,M} \\ \vdots & \vdots & \ddots & \vdots & \vdots \\ D_{N-1,1} & D_{N-1,2} & \cdots & D_{N-1,M-1} & D_{N-1,M} \\ D_{N,1} & D_{N,2} & \cdots & D_{N,M-1} & D_{N,M} \end{bmatrix}$$

Said N×M optical data matrix D is projected on the LCD N×M matrix optical switching structure 6. After selection of a N×M driving signal matrix S, an output optical data matrix D' is generated, wherein $$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \vdots & \vdots & \ddots & \vdots & \vdots \\ S_{N-1,1} & S_{N-1,2} & \cdots & S_{N-1,M-1} & S_{N-1,M} \\ S_{N,1} & S_{N,2} & \cdots & S_{N,M-1} & S_{N,M} \end{bmatrix},$$

$$D' = \begin{bmatrix} D'_{1,1} & D'_{1,2} & \cdots & D'_{1,M-1} & D'_{1,M} \\ D'_{2,1} & D'_{2,2} & \cdots & D'_{2,M-1} & D'_{2,M} \\ \vdots & \vdots & \ddots & \vdots & \vdots \\ D'_{N-1,1} & D'_{N-1,2} & \cdots & D'_{N-1,M-1} & D'_{N-1,M} \\ D'_{N,1} & D'_{N,2} & \cdots & D'_{N,M-1} & D'_{N,M} \end{bmatrix},$$

said N×M optical data matrix D' flows through M combiners 8 and is combined into M sets of output optical data $O_1$, $O_2, \ldots, O_{M-1}, O_M$. The so-called selection means that the N×M driving signal matrix S determines the input-output relationship of elements of the LCD N×M matrix optical switching structure 6. When $S_{P,Q}$ is 1 (0<P≦N, 0<Q≦M) $D'_{P,Q}=D_{P,Q}$. When $S_{P,Q}$ is 0, $D'_{P,Q}=0$. When $S_{P,Q}$ is R (R≠0, 1), $D'_{P,Q}=D_{P,Q}\times R$.

The so-called matrix optical switching structure is a switching structure which could determine by control whether the optical data projected on it could or could not pass through it. The LCD N×M matrix optical switching structure 6 is one of the matrix optical switching structures.

The driving signal matrix S could be provided by a driving system, or more specifically, by a computer.

FIGS. 2A and 2B illustrate the splitters. FIG. 2A shows a 1×4 (1 to 4) splitter 4, wherein $I_1$ is an input optical data from an optical fiber 3. After split by the splitter 4, four same output signals $I_1$ are output by four different optical fibers 38, 40, 42, 44. FIG. 2B shows a 1×2 (1 to 2) splitter 4, wherein $I_1$ is an input optical data from an optical fiber 3. After repeatedly split by the splitter 4 four same output signals $I_1$ are output by the four different optical fibers 38, 40, 42, 44.

FIG. 3 shows an LCD N×M matrix optical switching structure 18, when N=M, wherein N AND M are integers larger than or equal to 1.

FIGS. 4A and 4B show combiners 8. FIG. 4A shows a 4×1 (4 to 1) combiner 8, wherein $I_1, I_2, I_3, I_4$ are four different optical signals. $O_1$ is an output optical data from the optical fiber 9. FIG. 4B shows a 2×1 (2 to 1) combiner 8, wherein $I_1, I_2, I_3, I_4$ are four different input optical signals. $O_1$ is an output optical data from an optical fiber 9.

Figure 5B:
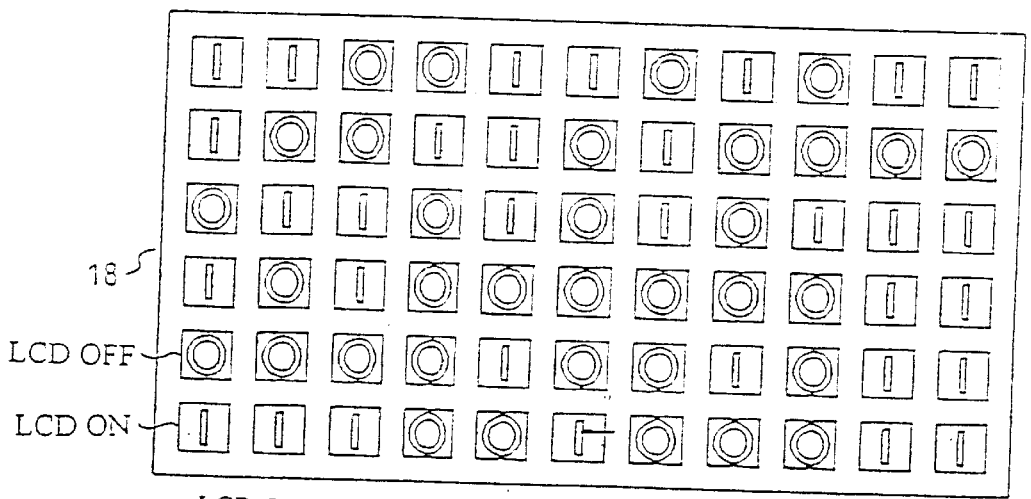
FIG. 5B is a top view of an LCD on/off switching table.

FIGS. 5A and 5B are a perspective view and top view of an LCD on/off switching structure, respectively. When the LCD is on (logic 1), the optical data could pass through an LCD N×M matrix optical switching structure 18 to a combiner. When the LCD is off (logic 0), the optical data could not pass through the LCD N×M matrix optical switching structure 18 to the combiner.

Figure 6A:
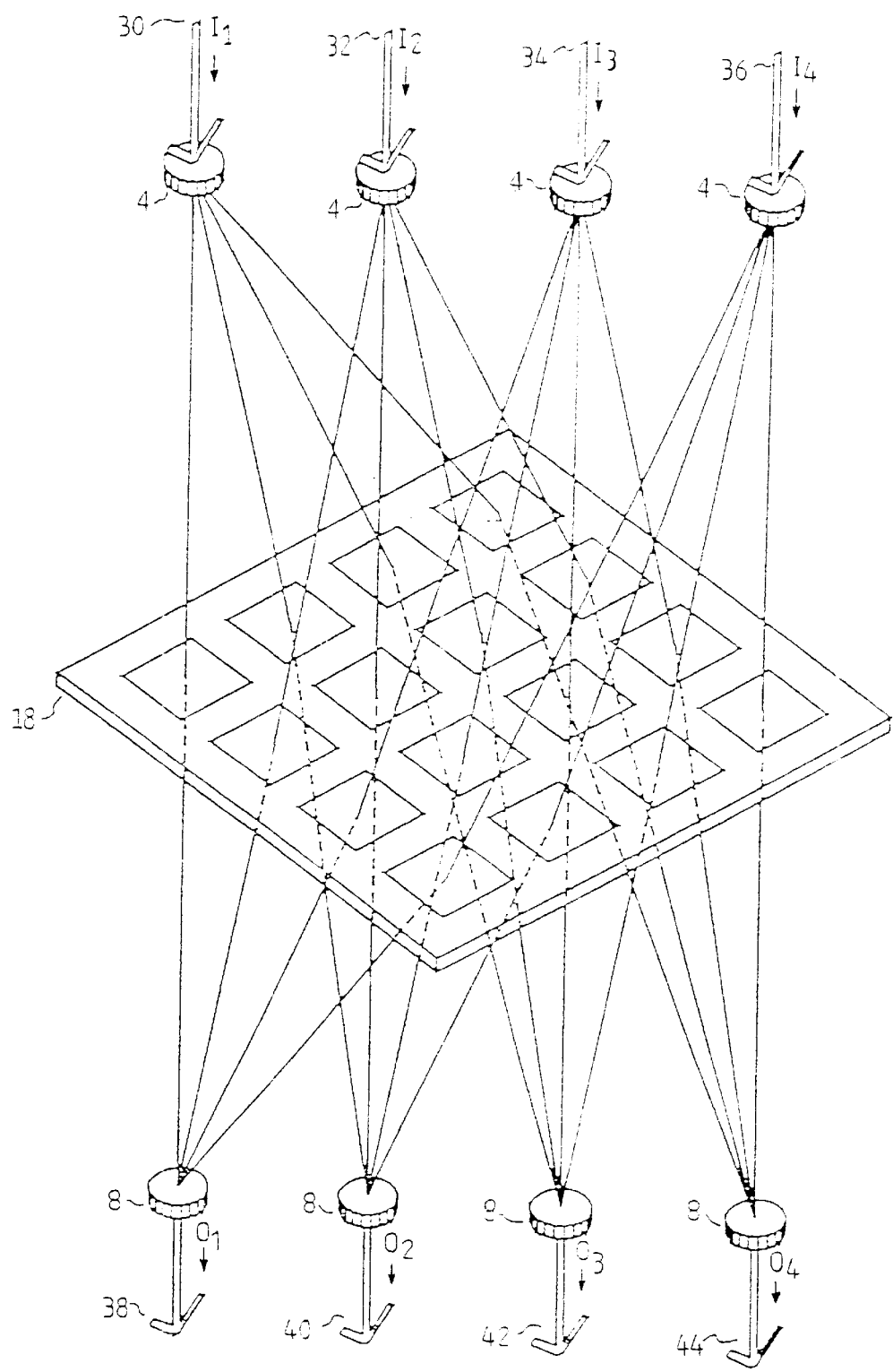
FIGS. 6A–6Q show the input-output relationships of an LCD 4×4 matrix optical switching system.
Figure 6C:
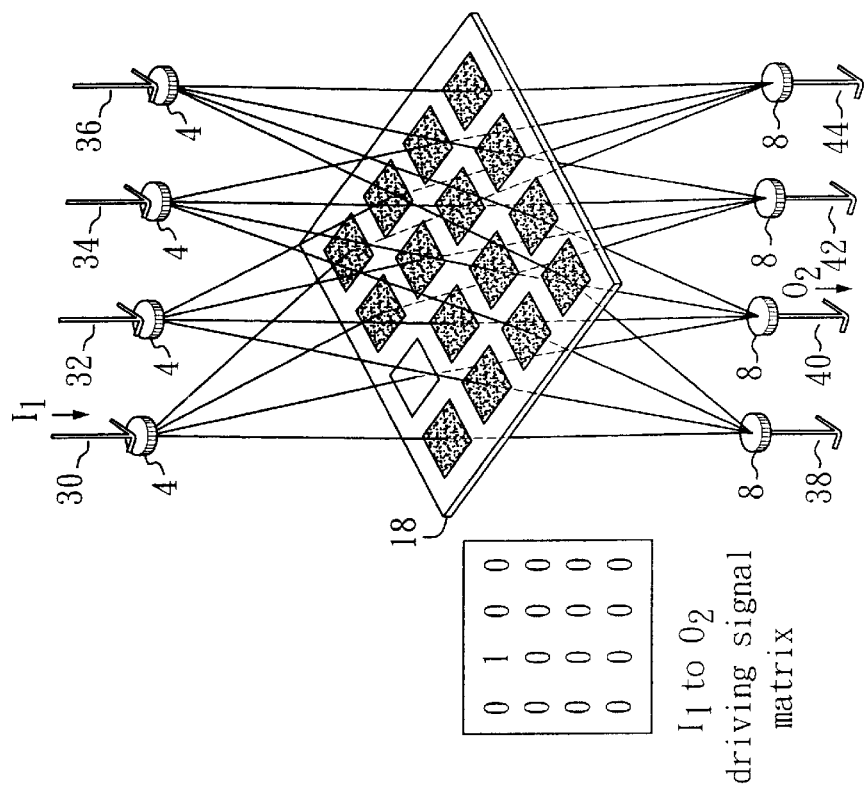
Figure 6B:
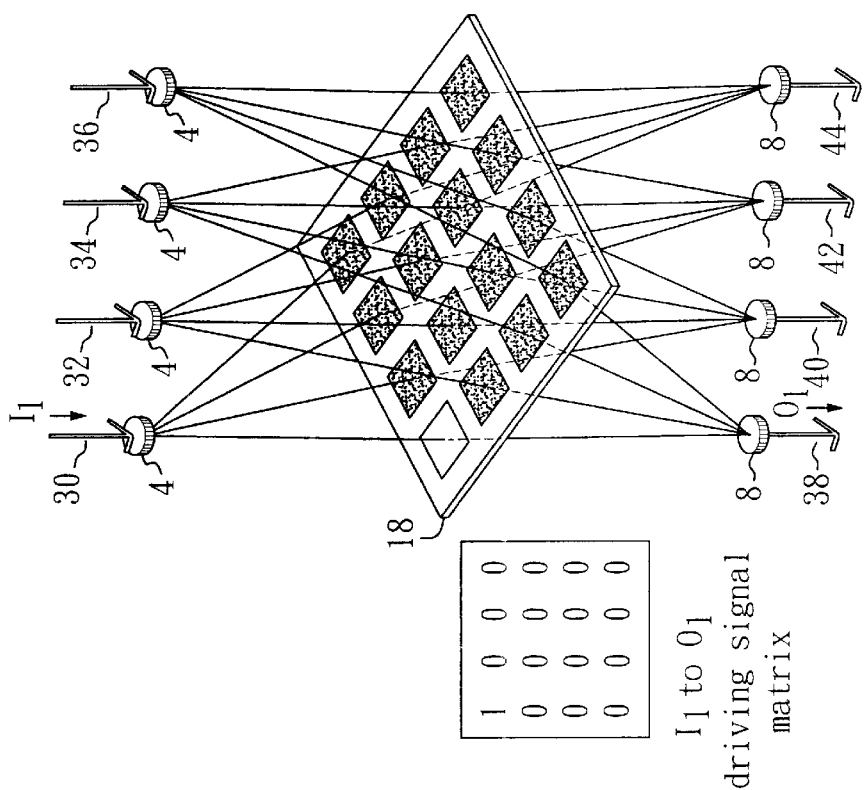
Figure 6E:
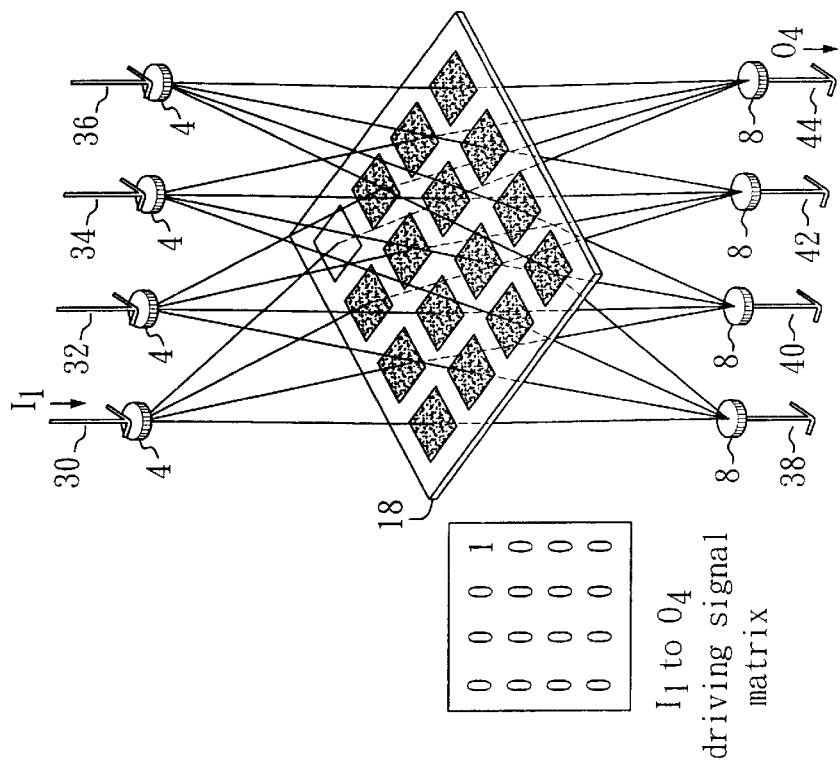
Figure 6D:
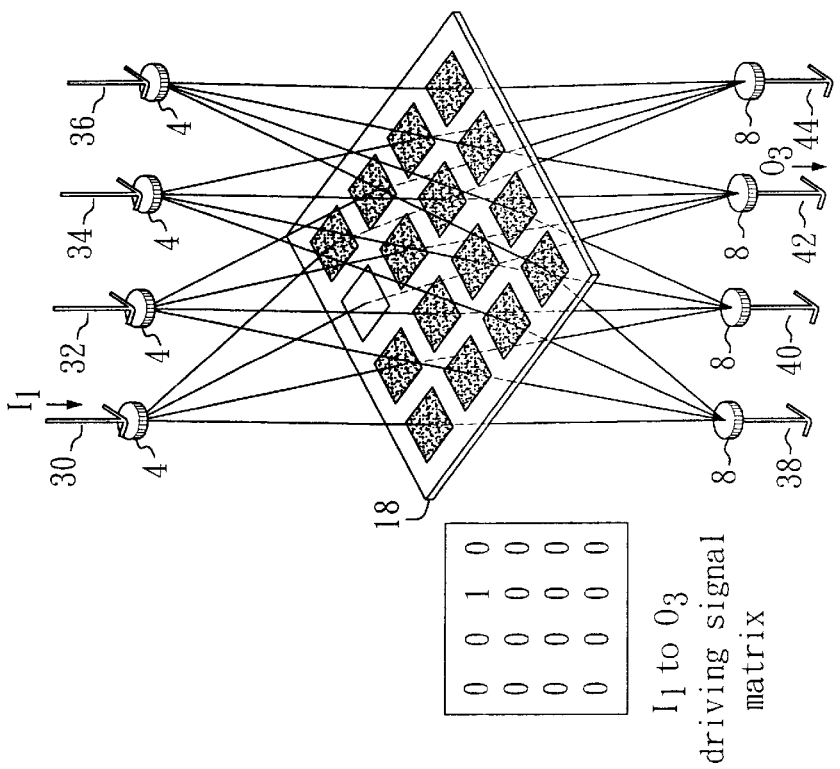
Figure 6G:
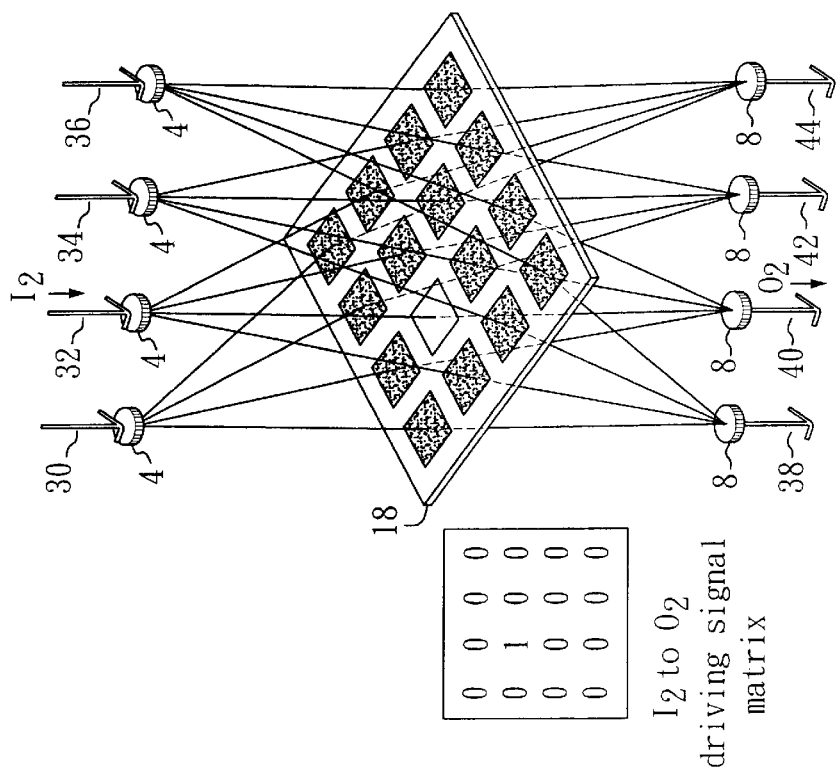
Figure 6F:
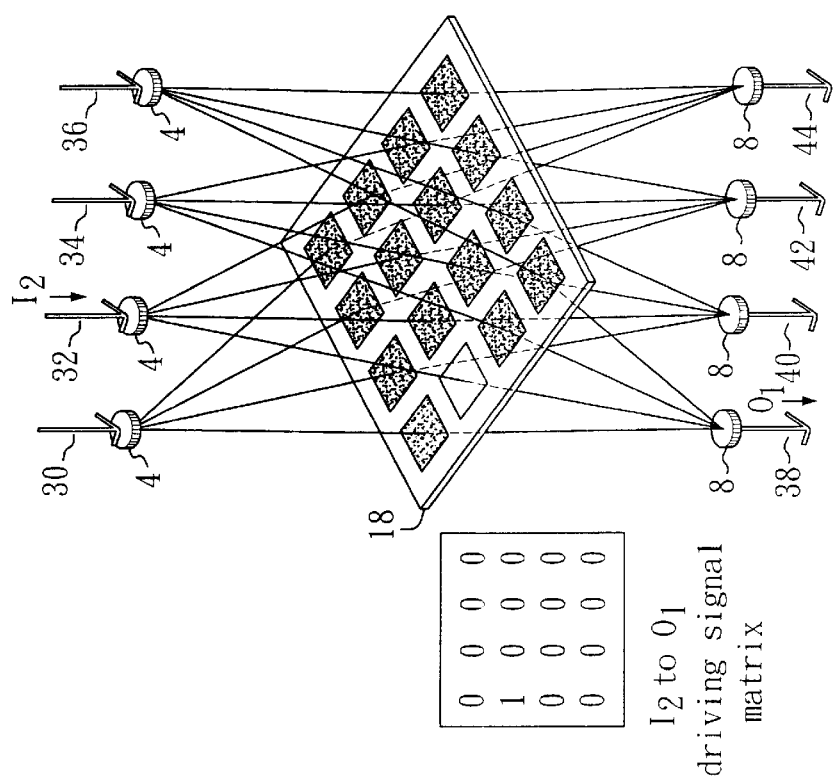
Figure 6I:
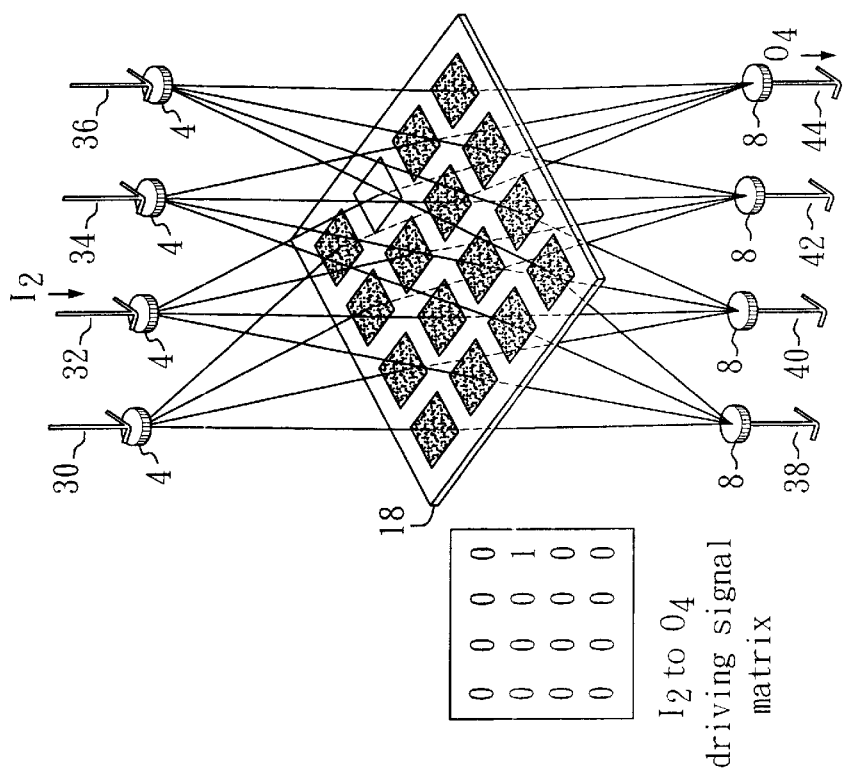
Figure 6H:
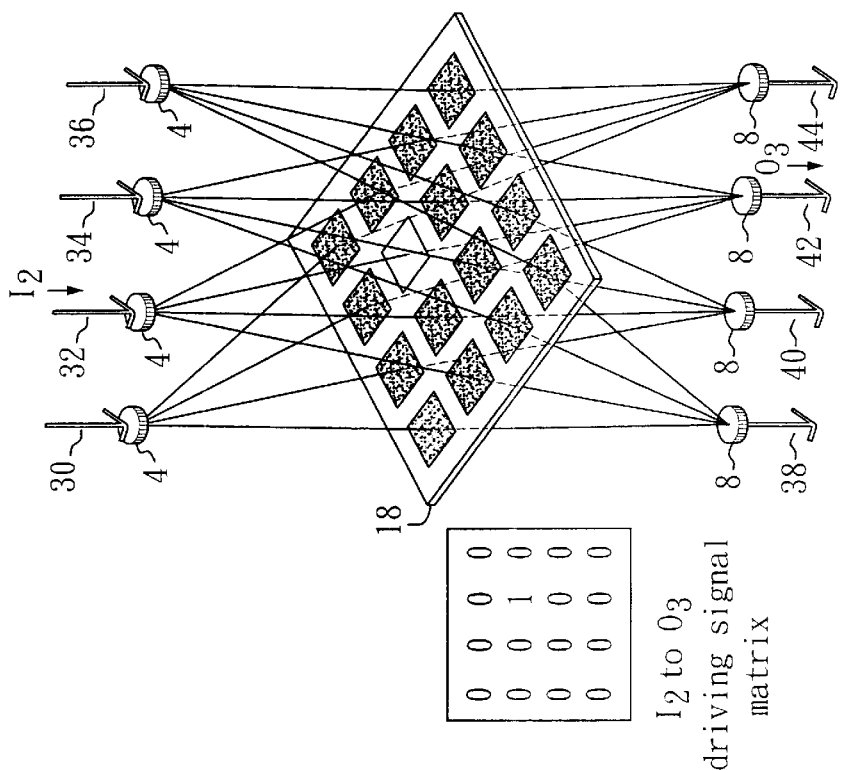
Figure 6K:
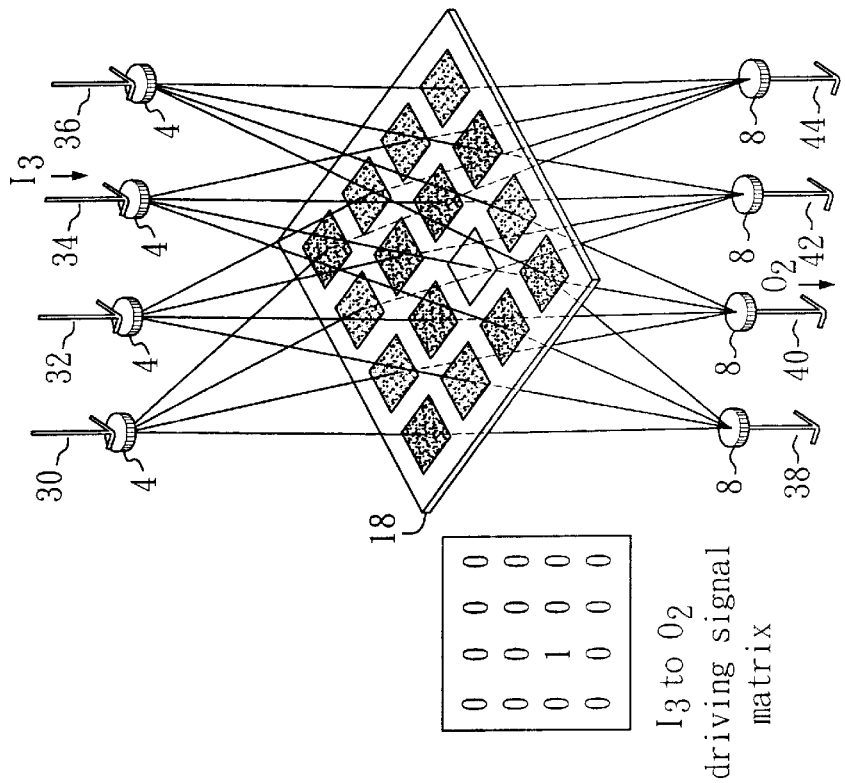
Figure 6J:
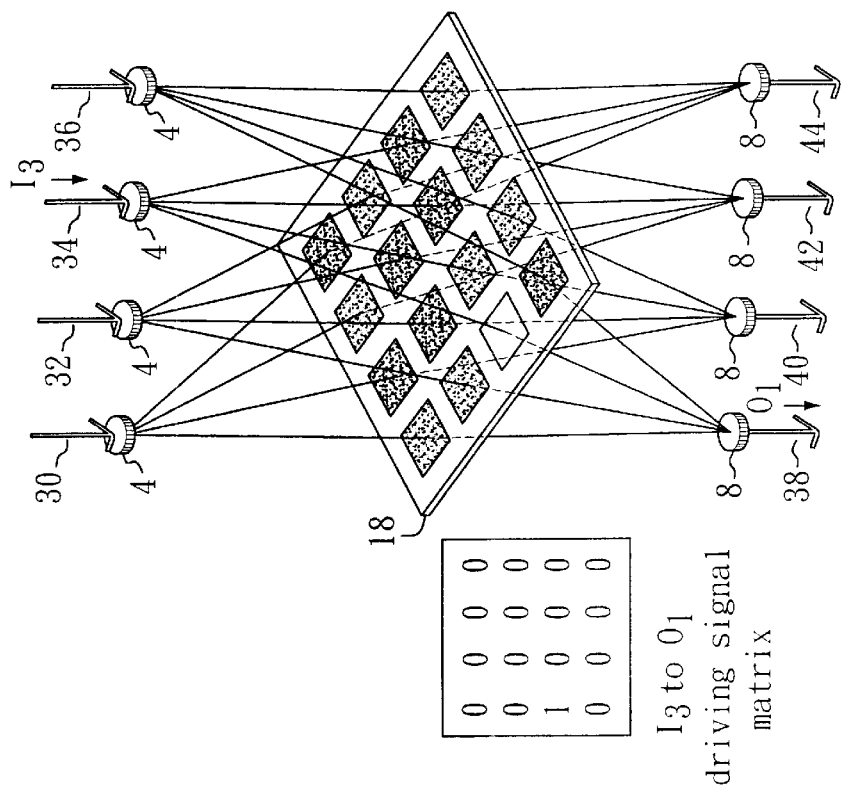
Figure 6M:
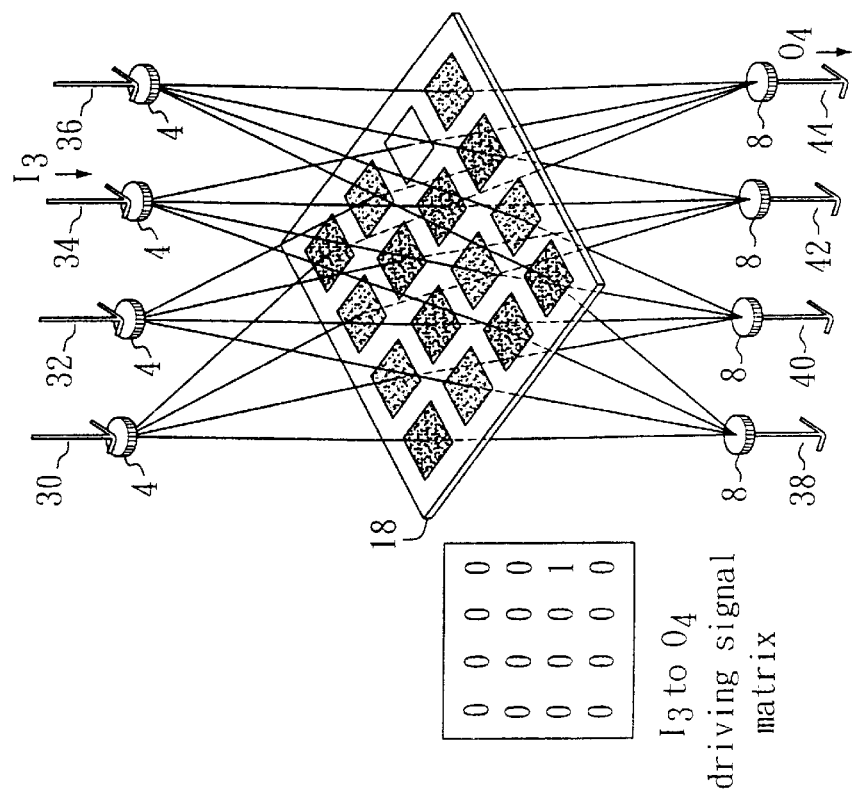
Figure 6L:
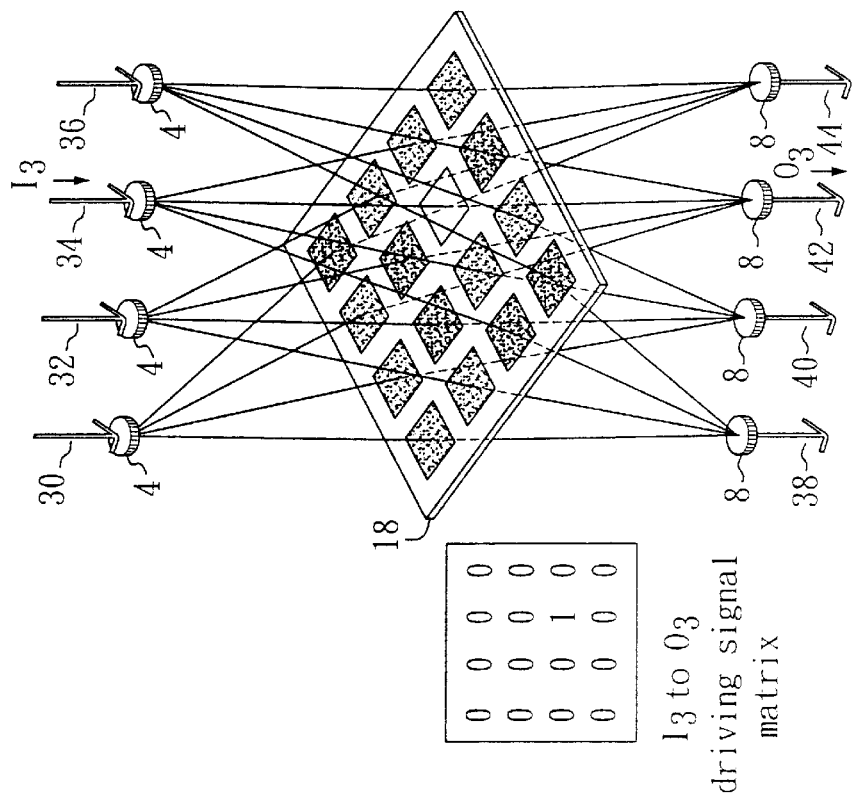
Figure 6O:
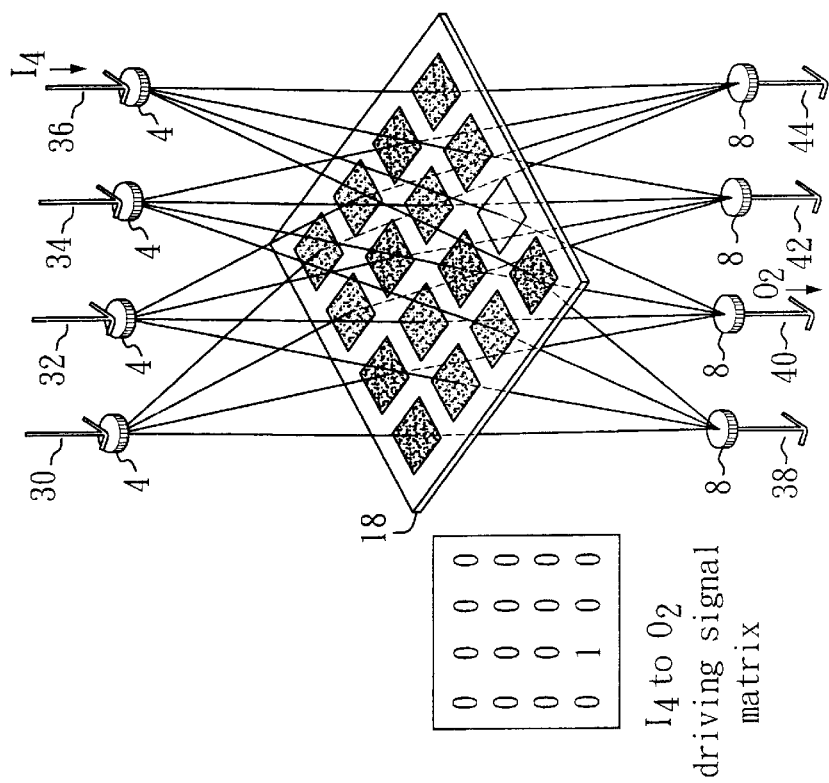
Figure 6N:
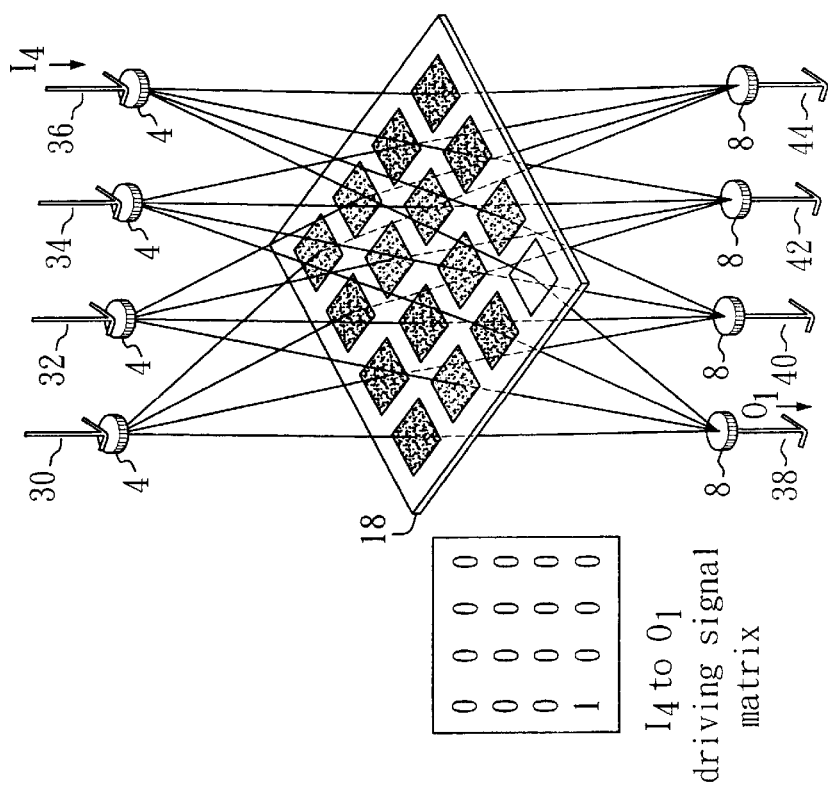
Figure 6Q:
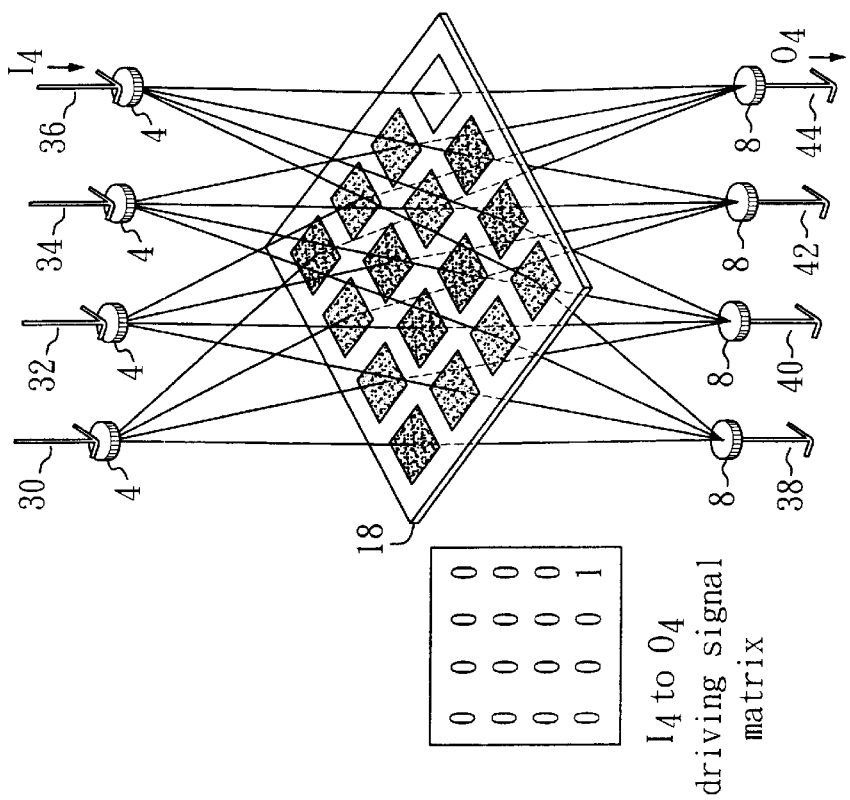
Figure 6P:
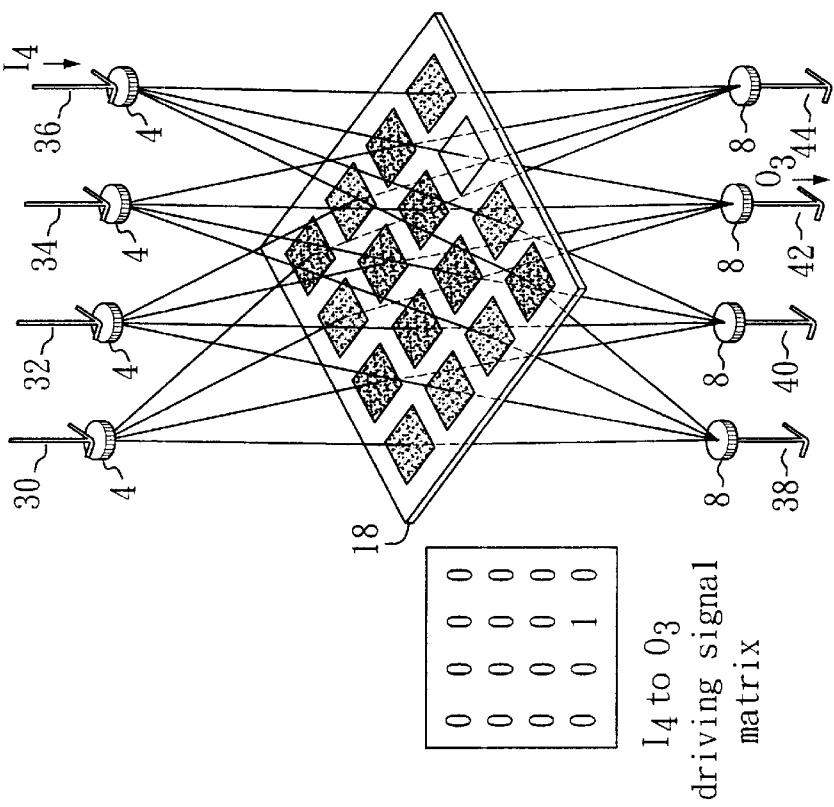

FIGS. 6A to 6Q show the input-output relationships of the all-optical switching system using the LCD 4×4 matrix switching structure according to the preferred embodiment. FIG. 6A indicates that 4 sets of optical data $I_1, I_2, I_3, I_4$ flow through 4 input optical fibers 30, 32, 34 and 36 into four different splitters 4 respectively. After split by the splitters, said 4 sets of optical data $I_1, I_2, I_3, I_4$ generate a 4×4 optical data matrix as below:

$$D = \begin{bmatrix} D_{1,1} & D_{1,2} & D_{1,3} & D_{1,4} \\ D_{2,1} & D_{2,2} & D_{2,3} & D_{2,4} \\ D_{3,1} & D_{3,2} & D_{3,3} & D_{3,4} \\ D_{4,1} & D_{4,2} & D_{4,3} & D_{4,4} \end{bmatrix},$$

wherein $D_{1,1}=D_{1,2}=D_{1,3}=D_{1,4}=I_1$, on the analogy of this. The data in the 4×4 optical data matrix pass through the LCD 4×4 matrix switching structure and are combined by the combiners. 4 output optical data $O_1, O_2, O_3, O_4$ generated by the combiners are output by 4 output optical fibers 38, 40, 42 and 44, respectively.

FIGS. 6B to 6Q indicate the input-output relationships of the different driving signals matrices. For example, In FIG. 6B, when the driving signal matrix $$S = \begin{bmatrix} 1 & 0 & 0 & 0 \\ 0 & 0 & 0 & 0 \\ 0 & 0 & 0 & 0 \\ 0 & 0 & 0 & 0 \end{bmatrix},$$

in the N×M optical data matrix $$D = \begin{bmatrix} D_{1,1} & D_{1,2} & D_{1,3} & D_{1,4} \\ D_{2,1} & D_{2,2} & D_{2,3} & D_{2,4} \\ D_{3,1} & D_{3,2} & D_{3,3} & D_{3,4} \\ D_{4,1} & D_{4,2} & D_{4,3} & D_{4,4} \end{bmatrix},$$

only the optical data $D_{1,1}$ can pass though the LCD 4×4 matrix switching structure to the combiner. All the other optical data could not pass the LCD 4×4 matrix switching structure. Thus, after passing the LCD 4×4 matrix switching structure, the 4×4 optical data matrix becomes $$\begin{bmatrix} D'_{1,1} & 0 & 0 & 0 \\ 0 & 0 & 0 & 0 \\ 0 & 0 & 0 & 0 \\ 0 & 0 & 0 & 0 \end{bmatrix},$$

wherein $D'_{1,1}=I_1$. The four sets of output optical data $O_1, O_2, O_3, O_4=D'_{1,1}$; 0, 0, 0=$I_1$, 0, 0, 0. FIGS. 6C to 6Q are on the analogy of this.

From the invention thus described, it will be obvious that the embodiments and description are not indeed to limit the invention. The invention may be varied in many ways. Such variations are not to be regarded as a departure from the spirit and scope of the invention, and all such modifications as would be obvious to one skilled in the art are intended for inclusion within the scope of the following claims.

What is claimed is:

1. An all-optical switching system, comprising:

N 1×M splitters for receiving N sets of optical data $I_1, I_2, \ldots, I_{N-1}, I_N$, wherein said N splitters split the N sets of optical data respectively into M sets of optical data to form an N×M optical data matrix D as below:

$$D = \begin{bmatrix} D_{1,1} & D_{1,2} & \cdots & D_{1,M-1} & D_{1,M} \\ D_{2,1} & D_{2,2} & \cdots & D_{2,M-1} & D_{2,M} \\ \vdots & \vdots & \ddots & \vdots & \vdots \\ D_{N-1,1} & D_{N-1,2} & \cdots & D_{N-1,M-1} & D_{N-1,M} \\ D_{N,1} & D_{N,2} & \cdots & D_{N,M-1} & D_{N,M} \end{bmatrix};$$

wherein N AND M are integers, $D_{1,1}, D_{1,2}, \ldots, D_{1,M-1}, D_{1,M}$ represent the M sets of optical data split from the first optical data by the first 1×M splitter, on the analogy of this representation;

an N×M matrix switching structure for receiving the N×M optical data matrix D generated by the splitters and to receive another driving signal matrix S as below:

$$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \vdots & \vdots & \ddots & \vdots & \vdots \\ S_{N-1,1} & S_{N-1,2} & \cdots & S_{N-1,M-1} & S_{N-1,M} \\ S_{N,1} & S_{N,2} & \cdots & S_{N,M-1} & S_{N,M} \end{bmatrix};$$

and for generating another N×M optical data matrix D' as below:

$$D' = \begin{bmatrix} D'_{1,1} & D'_{1,2} & \cdots & D'_{1,M-1} & D'_{1,M} \\ D'_{2,1} & D'_{2,2} & \cdots & D'_{2,M-1} & D'_{2,M} \\ \vdots & \vdots & \ddots & \vdots & \vdots \\ D'_{N-1,1} & D'_{N-1,2} & \cdots & D'_{N-1,M-1} & D'_{N-1,M} \\ D'_{N,1} & D'_{N,2} & \cdots & D'_{N,M-1} & D'_{N,M} \end{bmatrix}; \text{ and}$$

M N×1 combiners for receiving the N×M optical data matrix D' from the N×M matrix switching structure, wherein said M combiners combine N sets of optical data into M sets of optical data $O_1, O_2, \ldots, O_{M-1}, O_M$ respectively, and the first optical data $O_1$ is generated by the first combiner after combining N sets of optical data $D'_{1,1}, D'_{2,1}, \ldots, D'_{N-1,1}, D'_{N,1}$, on the analogy of this generation.

2. The all-optical switching system of claim 1, wherein said N×M matrix switching structure is an LCD N×M optical switching structure.

3. The all-optical switching system of claim 1, wherein said N sets of optical data $I_1, I_2, \ldots, I_{N-1}, I_N$ received by said N 1×M splitters are input by N optical fibers.

4. The all-optical switching system of claim 1, wherein said M sets of optical data $O_1, O_2, \ldots, O_{M-1}, O_M$ generated by said M N×1 combiners are output by M optical fibers.

5. The all-optical switching system of claim 1, wherein said driving signal matrix is provided by a driving system.

6. The all-optical switching system of claim 5, wherein said driving system is a computer.

7. The all-optical switching system of claim 1, wherein the element $S_{P,Q}$ of the driving signal matrix S is 1 or 0; $0<P\leq N$; $0\leq Q<M$; N and M are integers; when $S_{P,Q}=1$, $D'_{P,Q}=D_{P,Q}$; and when $S_{P,Q}=0$, $D'_{P,Q}=0$.

8. A method of converting N sets of input optical data into M sets of output optical data, comprising the following steps of:

providing N 1×M splitters for receiving N sets of optical data $I_1, I_2, \ldots, I_{N-1}, I_N$, wherein said N splitters split N sets of optical data respectively into M sets of optical data to form an N×M optical data matrix D as below:

$$D = \begin{bmatrix} D_{1,1} & D_{1,2} & \cdots & D_{1,M-1} & D_{1,M} \\ D_{2,1} & D_{2,2} & \cdots & D_{2,M-1} & D_{2,M} \\ \vdots & \vdots & \ddots & \vdots & \vdots \\ D_{N-1,1} & D_{N-1,2} & \cdots & D_{N-1,M-1} & D_{N-1,M} \\ D_{N,1} & D_{N,2} & \cdots & D_{N,M-1} & D_{N,M} \end{bmatrix};$$

wherein N and M are integers; $D_{1,1}, D_{1,2}, \ldots, D_{1,M-1}, D_{1,M}$ represent the M sets of optical data split $I_1$ from the first optical data by the first 1×M splitter, on the analogy of this representation;

providing N×M matrix switching structure for receiving the N×M optical data matrix D generated by the splitters and another driving signal matrix S as below:

$$S = \begin{bmatrix} S_{1,1} & S_{1,2} & \cdots & S_{1,M-1} & S_{1,M} \\ S_{2,1} & S_{2,2} & \cdots & S_{2,M-1} & S_{2,M} \\ \vdots & \vdots & \ddots & \vdots & \vdots \\ S_{N-1,1} & S_{N-1,2} & \cdots & S_{N-1,M-1} & S_{N-1,M} \\ S_{N,1} & S_{N,2} & \cdots & S_{N,M-1} & S_{N,M} \end{bmatrix};$$

and for generating another N×M optical data matrix D' as below:

$$D' = \begin{bmatrix} D'_{1,1} & D'_{1,2} & \cdots & D'_{1,M-1} & D'_{1,M} \\ D'_{2,1} & D'_{2,2} & \cdots & D'_{2,M-1} & D'_{2,M} \\ \vdots & \vdots & \ddots & \vdots & \vdots \\ D'_{N-1,1} & D'_{N-1,2} & \cdots & D'_{N-1,M-1} & D'_{N-1,M} \\ D'_{N,1} & D'_{N,2} & \cdots & D'_{N,M-1} & D'_{N,M} \end{bmatrix}; \text{ and}$$

providing M N×1 combiners for receiving the output N×M optical data matrix D' from the N×M matrix switching structure, wherein said M combiners combine N sets of optical data into M sets of optical data $O_1, O_2, \ldots, O_{M-1}, O_M$ respectively, and the first optical data $O_1$ is generated by the first combiner after combining N sets of optical data $D'_{1,1}, D'_{2,1}, \ldots, D'_{N-1,1}, D'_{N,1}$, on the analogy of this generation.

9. The method of claim 8, wherein said N sets of optical data $I_1, I_2, \ldots, I_{N-1}, I_N$ received by said N 1×M splitters are input by N optical fibers.

10. The method of claim 8, wherein said M sets of optical data $O_1, O_2, \ldots, O_{M-1}, O_M$ generated by said M N×1 combiners are output by M optical fibers.

11. The method of claim 8, wherein said driving signal matrix is provided by a driving system.

12. The method of claim 8, wherein the element $S_{P,Q}$ of the driving signal matrix S is 1 or 0; $0<P\leq N$; $0<Q\leq M$; N and M are integers; when $S_{P,Q}=1$, $D'_{P,Q}=D_{P,Q}$; when $S_{P,Q}=0$, $D'_{P,Q}=0$.

* * * * *